2 Sheets—Sheet 1.

E. T. BURROWES.

SHADE ATTACHMENT.

No. 11,618.

Reissued June 29, 1897.

Attest:
W. E. Burdine.
G. A. Pennington

Inventor
Edward T. Burrowes,
by L. S. Bacon
Atty.

2 Sheets—Sheet 2.

E. T. BURROWES.

SHADE ATTACHMENT.

No. 11,618.

Reissued June 29, 1897.

Witnesses

Chas. W. Parker.

Jas. H. Milans.

Inventor

E. T. Burrowes

By R. S. Bacon

Attorney

UNITED STATES PATENT OFFICE.

EDWARD T. BURROWES, OF PORTLAND, MAINE, ASSIGNOR TO THE E. T. BURROWES COMPANY, OF SAME PLACE.

SHADE ATTACHMENT.

SPECIFICATION forming part of Reissued Letters Patent No. 11,618, dated June 29, 1897.

Original No. 476,783, dated June 14, 1892. Application for reissue filed October 13, 1894. Serial No. 525,840.

*To all whom it may concern:*

Be it known that I, EDWARD T. BURROWES, a citizen of the United States, residing at Portland, in the county of Cumberland and State of Maine, have invented certain new and useful Improvements in Shade Attachments; and I do hereby declare the following to be a full, clear, and exact description of the invention, such as will enable others skilled in the art to which it appertains to make and use the same.

This invention relates more especially to that class of frictional holding mechanism for spring-actuated shades patented by H. L. Hall, dated June 2, 1891, numbered 453,409, and purchased by me, the object of the present invention being to provide extension-tips independent of the spring-releasing rods.

In the Hall patent above noted the frictional tips are formed integral with the spring-rods, and their movement is necessarily limited in both directions by the finger-pieces or actuating-pendants attached to said rods. This has been found in practice to be a disadvantage, for if a shade is carelessly forced up at either side by pushing directly upon either end of the shade-stick instead of pressing the said pendants together and permitting the shade to rise by action of the spring-actuated shade-roller in the ordinary way the end thus forced upward is liable to disengage itself from the groove in the window-frame in which it is intended to operate, which, while doing no permanent damage, is nevertheless regarded with more or less disfavor.

My present invention entirely obviates this difficulty; and it consists, essentially, in frictional tips which are operated upon by the springs only in an outward direction, as fully set forth in the following specification and claims, and clearly illustrated in the accompanying drawings, in which—

Figure 1:
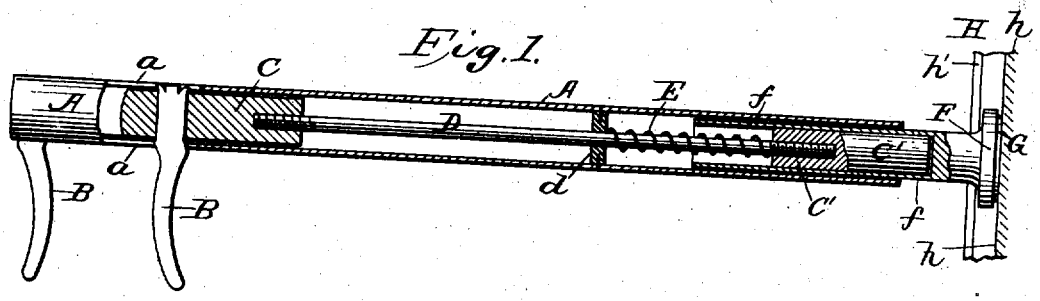
Figure 2:
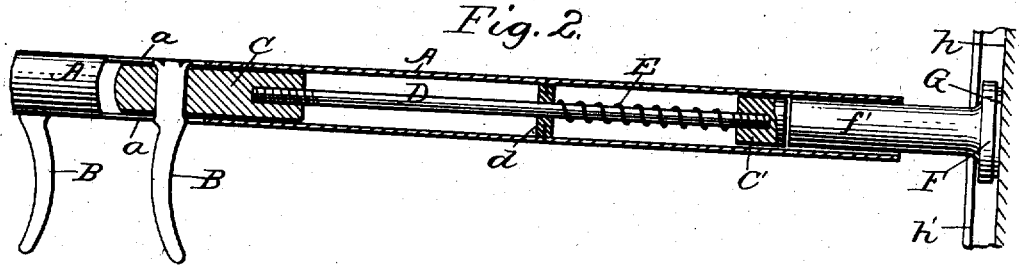
Figure 3:
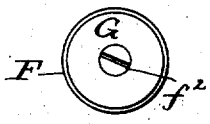
Figure 4:
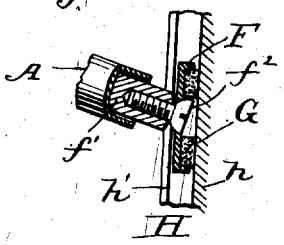
Figure 5:
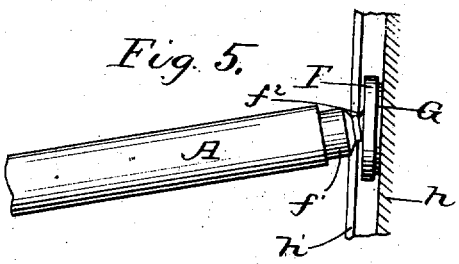

Figure 1 represents a portion of a shade-stick in sectional elevation made in accordance with my improvements and a section of the window-frame and its groove, Fig. 2 being a similar view showing a slight modification of my invention. Fig. 3 is an end elevation of a frictional tip which is loosely joined to the spindle portion which enters the shade-stick. Fig. 4 is a vertical cross-section of the same within its groove in the window-frame, showing one form of loose connection with its spindle, the latter, with a section of a shade-stick, being shown at an angle. Fig. 5 is a view of my invention in broken elevation, representing the construction shown in Figs. 3 and 4; and Fig. 6 is a longitudinal section, showing parts in elevation, of the preferred form of fixture.

Figure 6:
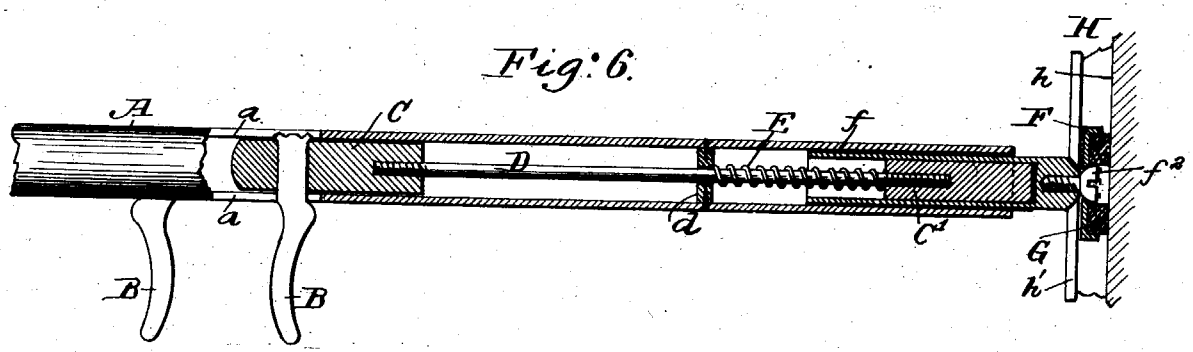

In Figs. 1, 2, and 6 I have shown but one end of a fixture, it being understood that the opposite end is in all respects similar to that shown.

Similar reference-letters denote corresponding parts.

The hollow shade-stick A is slotted at *a a* for the admission of the pendants B, which enter the inner heads C of the spring-actuated rods D. The springs E operate expansively between the outer heads C′ and the stop-collars *d*.

My improved extension-tip F may be provided with an outer facing of rubber, as at G, and either rigidly connected to a hollow or solid plug or spindle, as shown, respectively, at *f* in Fig. 1 and *f′* in Fig. 2, or said tip may be loosely connected to either form of spindle *f f′*, as in Figs. 3, 4, and 5.

The hollow form of spindle *f* has the advantage of a longer bearing-surface within the shade-stick A by being made to receive the outer head C′ of the rod D; but otherwise its operation is identical with the other form of spindle *f′*.

By the use of a flanged or T groove H upon the window-frame *h* in connection with the tips F, which are of larger diameter than their spindles, the movement of the latter relative to the spring-actuated rods D is very slight.

The outer heads C′ of the rods D rest normally against the spindles *f f′* of the said tips F, and when the pendants B are compressed said tips are simply relieved of the pressure by not being moved inward thereby, as they are independent of the spring-actuated rods. Hence if either end of the shade-stick should be forced upward the spindle *f* or *f′* would move automatically outward, the tip F retaining its position in the groove H; but if the tips F are formed rigid with their spindles, as in Figs. 1 and 2, their movement when at an angle is limited by the thickness of the tip F relative to the distance between the window-frame $h$ and the flanges $h'$ of the groove H. To prevent the tips from binding within their grooves under such circumstances, a loose connection of the tip with its spindle is of advantage, which may be simply brought about by a screw $f^2$, which passes loosely through the tip F and is threaded to its spindle $f$ or $f'$, as seen in Figs. 3, 4, 5, and 6, thus permitting the tip to remain in its normal position, while the shade-stick and the spindle may be at an angle.

Having thus described my improvements, what I claim is—

1. In frictional shade-holding mechanism, the combination with the spring-actuated rods, of independently-movable spindles, suitable friction-tips, and a universal joint connecting each of said spindles with its tip, substantially as described.

2. The combination with the hollow shade-stick and spring-actuated rods therein, of independently-movable hollow spindles fitting within the outer ends of said hollow shade-stick and adapted to receive the outer end of either spring-actuated rod, and friction-tips attached by universal joint to the outer ends of said hollow spindles, substantially as described.

3. The combination with the hollow shade-stick and spring-actuated rods therein, of independently-movable hollow spindles fitting said hollow shade-stick and adapted to receive the outer end of either spring-actuated rod, and friction-tips attached to the outer ends of said hollow spindles, substantially as described.

4. The combination with a slotted shade-stick, of spring-actuated rods within the stick, handles connected to the rods and extending through the slots in the stick, and independently-movable members carrying friction devices located at the outer ends of the rods.

5. In a spring-actuated shade-holding device, the combination with a shade-stick, of a spindle loosely engaging therewith and carried thereby, a holding-tip loosely connected to the spindle, a spring independent of the spindle for forcing the same outward, and a spring-compressing rod having a handle which projects through the stick.

6. In a device for holding spring-actuated shades, the combination with a shade-stick, of a spindle loosely engaging therewith, a holding-tip, a pivotal connection between the tip and spindle, a spring carried by the stick normally engaging the spindle, but independent thereof, and means whereby the spring may be compressed, substantially as described.

In testimony whereof I affix my signature in the presence of two witnesses.

EDWARD T. BURROWES.

Witnesses:
H. W. ROBINSON,
E. A. STERLING.